(12) United States Patent
Rivas et al.

(10) Patent No.: US 11,558,535 B2
(45) Date of Patent: Jan. 17, 2023

(54) INTEGRATED LENS MOUNT AND HEAT SINK

(71) Applicant: ZF Active Safety and Electronics US LLC, Livonia, MI (US)

(72) Inventors: Anthony Rivas, Royal Oak, MI (US); Jeff Dudek, Canton, MI (US)

(73) Assignee: ZF Active Safety and Electronics US LLC, Livonia, MI (US)

( * ) Notice: Subject to any disclaimer, the term of this patent is extended or adjusted under 35 U.S.C. 154(b) by 0 days.

(21) Appl. No.: 17/308,945

(22) Filed: May 5, 2021

(65) Prior Publication Data

US 2022/0360690 A1 Nov. 10, 2022

(51) Int. Cl.
 *H04N 5/225* (2006.01)
(52) U.S. Cl.
 CPC ......... *H04N 5/2253* (2013.01); *H04N 5/2252* (2013.01); *H04N 5/2254* (2013.01); *H04N 5/2256* (2013.01)

(58) Field of Classification Search
 CPC .... H04N 5/2253; H04N 5/225; H04N 5/2254; H05N 6/2256
 See application file for complete search history.

(56) References Cited

U.S. PATENT DOCUMENTS

| | | | |
|---|---|---|---|
| 2013/0271588 A1* | 10/2013 | Kirma | A61B 1/05 348/76 |
| 2013/0286226 A1* | 10/2013 | Baum | H04N 5/2254 348/207.1 |
| 2018/0013271 A1* | 1/2018 | Goulden | H02G 3/04 |
| 2018/0013934 A1* | 1/2018 | Germe | G08B 25/08 |

\* cited by examiner

*Primary Examiner* — Amy R Hsu
(74) *Attorney, Agent, or Firm* — Kristin L. Murphy

(57) ABSTRACT

A camera assembly for an interior of an automobile is disclosed. The camera assembly includes a lens, an image sensor, a printed circuit board, at least one illuminator, and a lens mount. The lens, image sensor and at least one illuminator are operatively connected to the printed circuit board. The lens mount includes at least one integrated heat sink configured to dissipate heat from the at least one illuminator.

21 Claims, 6 Drawing Sheets

INTEGRATED LENS MOUNT AND HEAT SINK

TECHNICAL FIELD

The disclosure relates generally to a camera arrangement for a vehicle and more specifically to an occupant facing camera having an integrated lens mount and heat sink.

BACKGROUND

Driver assistance systems incorporate visual, acoustic and/or sensor warnings for drivers to detect potential driving dangers and prevent accidents. Many of these systems are focused on potential dangers external to the vehicle. However, as there exist a number of potential distractions for a driver in a vehicle cabin (i.e., mobile phones, internal displays, etc.), occupant monitoring systems (e.g., driver monitoring systems) are being employed for inclusion in vehicles to capture driver behavior during driving events, especially during a driving event that results in an accident, as well as initiating warnings to drivers, if the driver is detected to be in a non-alert state.

In known systems, an occupant monitoring system includes a camera assembly with a field of view directed toward a cabin of the vehicle. However, interior cabin space is at a premium when packaging remote camera assemblies. In addition, illuminators (for example, those that emit light in the near infrared spectrum) are often needed to provide uniform lighting conditions for all environmental conditions (i.e., daylight, night). But because illuminators have additional requirements for power dissipation in a camera assembly, providing a compact camera assembly presents a challenge. What is needed is a compact design for a camera assembly that permits effective positioning in a vehicle cabin, but also allows for heat dissipation associated with the illuminators needed to capturing effective occupant images under a variety of conditions.

SUMMARY

A camera assembly for an interior of an automobile is disclosed. In one exemplary arrangement, the camera assembly includes a lens, an image sensor, a printed circuit board, at least one illuminator, and a lens mount. The lens, image sensor and at least one illuminator are operatively connected to the printed circuit board. The lens mount includes at least one integrated heat sink configured to dissipate heat from the at least one illuminator. With this arrangement, a compact design of the camera assembly can be achieved that reduces complexity of the camera assembly over prior art systems. As such, the camera assembly may be effectively mounted in the vehicle cabin with minimal packaging requirements. In one exemplary arrangement, the camera assembly may be mounted to the interior rearview mirror.

In another exemplary arrangement, the lens mount includes a central mount section and side mount arms that extend outwardly from the central mount section. The lens is disposed within the central mount section.

In another exemplary arrangement, at least a pair of illuminators are provided with the camera assembly, with one illuminator provided on the side mount arms of the lens mount on either side of the lens mount. In addition, each of the pair of illuminators is positioned adjacent a heat sink to as to dissipate heat from the illuminators. The illuminators may emit light that is in in the near infrared spectrum.

In another exemplary configuration, the printed circuit board include integrated satellite printed circuit boards for facilitating operation of the illuminators. In one arrangement, the satellite printed circuit boards are laterally spaced from the printed circuit board, but operatively connected thereto by an interface. The interface may have a C-shape with operative ends in contact with the printed circuit board and a satellite printed circuit board. The interface may be rigid, semi-rigid, or flexible.

In another exemplary configuration, the camera assembly may include at least one alert indicator that is operatively connected to the printed circuit board. A second interface may extend from the printed circuit board and operatively connect to a satellite printed circuit board to which the alert indicator is connected. In one exemplary arrangement, the alert indicator is oriented perpendicular to the printed circuit board. The alert indicators may include indicators that emit light that is in the visible spectrum.

In one exemplary arrangement, a gasket is provided for the lens. More specifically, the gasket is disposed around the lens. The gasket serves to prevent the lens from receiving off-axis light reflected or refracted by a cover glass of the lens from the at least one illuminator to provide effective operation of the lens and image processor.

BRIEF DESCRIPTION OF THE DRAWINGS

Exemplary arrangements of the present disclosure will now be described in greater details with reference to the attached figures in which.

DETAILED DESCRIPTION

Figure 1:
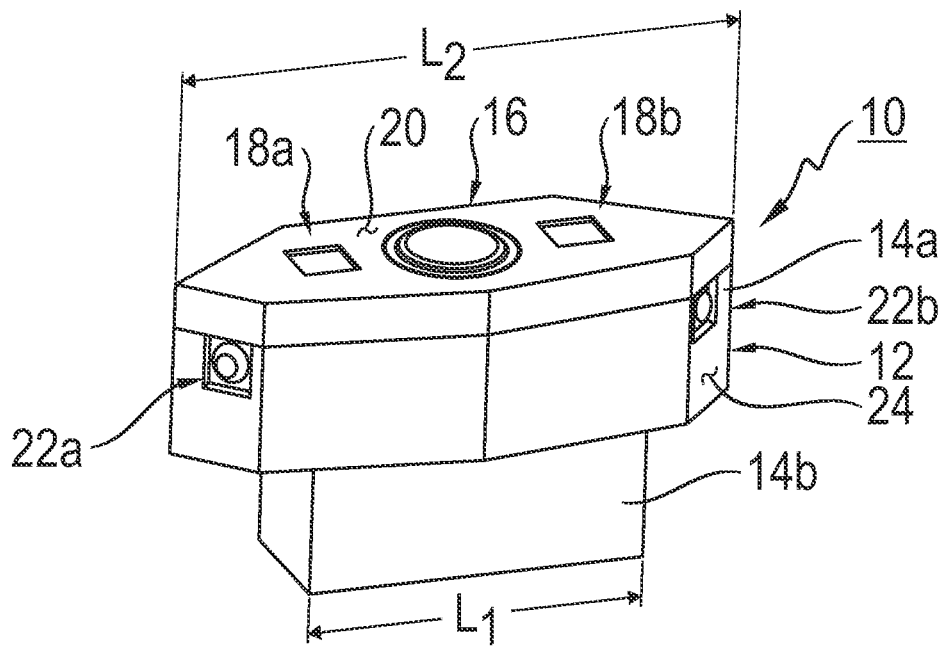
FIG. 1 is a perspective view of an exemplary arrangement of a camera assembly.

Referring now to the discussion that follows and also to the drawings, illustrative approaches to the disclosed assemblies and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Referring to FIGS. 1-13, arrangements of camera assemblies 10 and 100 are illustrated. More specifically, referring to FIG. 1, a first arrangement of a camera assembly 10 is illustrated. The illustrated arrangement includes a housing 12, which may be formed in two different portions, i.e., an upper housing portion 14a and a lower housing portion 14b. In one exemplary arrangement the lower housing 14b has a length L1 that is smaller than a length L2 of the upper housing 14a. The lower housing 14b is configured to be disposed over a connector 15 (shown in FIG. 2). The connector 15 facilitates power to internal components of the camera assembly. In the exemplary arrangement shown, a portion of the connector 15 extends generally parallel to the length L2 of the upper housing 14a such that an operative end 17 of the connector 15 has a receptacle oriented generally perpendicular to a front face of the upper housing 14a.

The housing 12 includes a number of openings through which different elements of the camera assembly 10 may protrude. More specifically, housing 12 includes a lens opening 16 and a first set of illumination openings 18a, 18b. In the exemplary arrangement, the lens opening 16 may be centered within a forward face 20 of the housing 12. One or more illumination openings 18a, 18b are also disposed in the forward face 20 of the housing 12.

Figure 2:
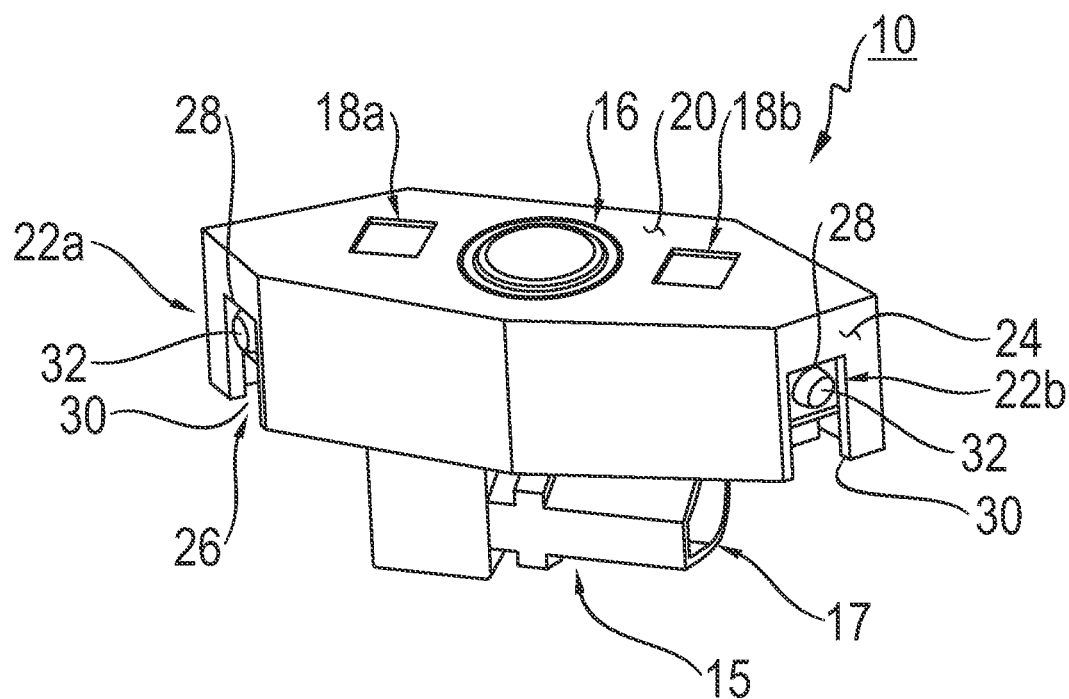
FIG. 2 is a perspective view of the camera assembly of FIG. 1, with a lower housing portion removed.

In a further exemplary arrangement, additional indicator openings 22a, 22b may be disposed below the forward face 20 in a peripheral surface 24 of the housing 12. Referring to FIG. 2, indicator openings 22a, 22b may be in the form of channels 26 that are defined by a closed end 28 and an open end 30. With the channel 26 arrangement, the upper housing 14a may be disposed over internal components of the camera assembly 10 (as further described below), allowing indicators 32 to slide within the channels 26. Indicator openings 22a, 22b may be spaced apart on opposite ends of the housing 12.

Figure 3:
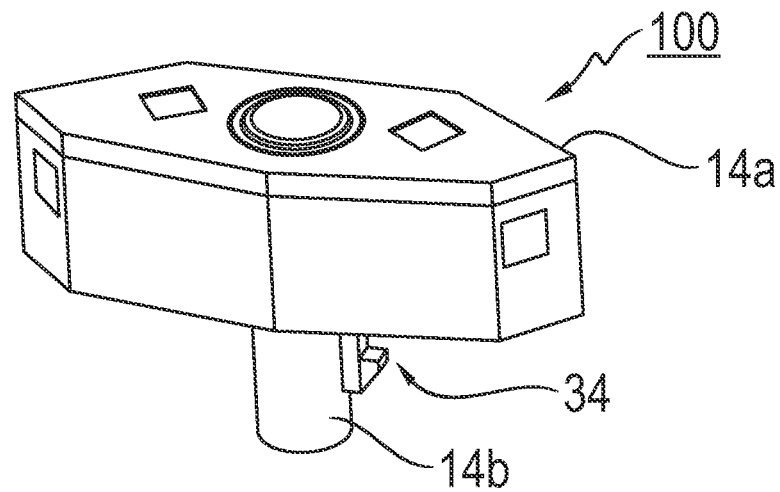
FIG. 3 is a perspective view of an exemplary arrangement of a camera assembly.
Figure 4:
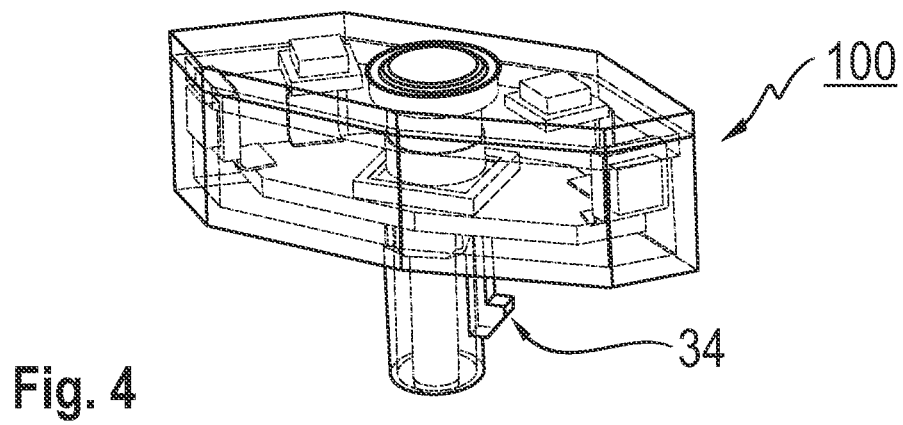
FIG. 4 is a perspective view of the camera assembly of FIG. 3, illustrating select internal components of the camera assembly.
Figure 5:
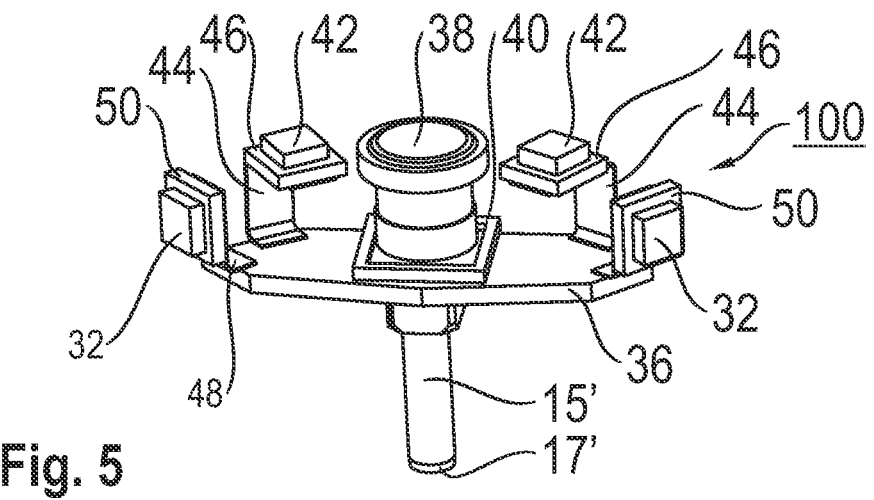
FIG. 5 is a perspective view of the select internal components of the camera assembly of FIG. 4.

Referring to FIGS. 3 and 4, an alternative arrangement of a lower housing 14b is illustrated. In this arrangement, the lower housing 14b' extends from upper housing 14a along a central axis. In one exemplary arrangement, the lower housing 14b' may include a locking detent 34 to secure the camera assembly 100 in or to a vehicle component, such as, for example, a rearview mirror. In the exemplary arrangement of FIGS. 3 and 4, a connector 15' of the camera assembly 100 is oriented generally perpendicular to the top face 20 of the upper housing 14a such that an operative end 17' of the connector 15' has a receptacle oriented in facing opposite from the forward face 20 of the housing 12.

Referring to FIGS. 4-12, internal components of camera assemblies 10 and 100 will be discussed. Camera assemblies 10 and 100 comprise a printed circuit board (PCB) 36, a camera lens 38, an image sensor 40, and one or more illuminators 42. The illuminators 42 (which emit light in the near infrared (IR) spectrum) are used to provide uniform lighting conditions across all environmental conditions to allow clearer images from the camera assemblies 10, 100. In one exemplary arrangement, the illuminators 42 are LED lights. The illuminators 42 are spaced from the PCB 36 by an interface 44 that is coupled to the PCB 36. More specifically, the camera assemblies 10 and 100 include satellite PCBs 46 that are operatively connected to the illuminators 42. The interfaces 44 may be rigid, semi-flexible, or flexible. The interfaces 44 serve to connect the PCB 36 to the satellite PCBs 46. The interfaces 44 may also be formed in a general C-shaped configuration such that in one exemplary arrangement, the satellite PCBs 46 are arranged in a plane that is generally parallel to a plane in which the PCB 36 is arranged.

In one exemplary configuration, a second interface 48 is operatively connected to optional alert indicators 32 that are positioned to extend through the peripheral surface 24 so as not to interfere with operation of lens 38 or illuminators 42. Alert indicators 32 are illuminators in the visible spectrum. Alert indicators 32 are used to provide a visual alert to the driver in the event that images captured by the image processor detect that the driver is not in an alert mode, but are not used as part of the camera perception or visualization. For example, a vehicle controller (not shown) operatively connected to the camera assembly 10, 100 may determine that images captured of the driver by the camera assembly 10, 100 indicate that the driver is engaging in activities (such as looking at a mobile phone) that is distracting the driver during a driving event. In such an instance, the alert indicators 32 may be activated to alert the driver. In this arrangement, the second interface 48 has a generally L-shape configuration. Satellite PCBs 50 are connected to the PCB 36 by the interface 48. The alert indicators 32 are connected to the satellite PCBs 50.

Figure 6:
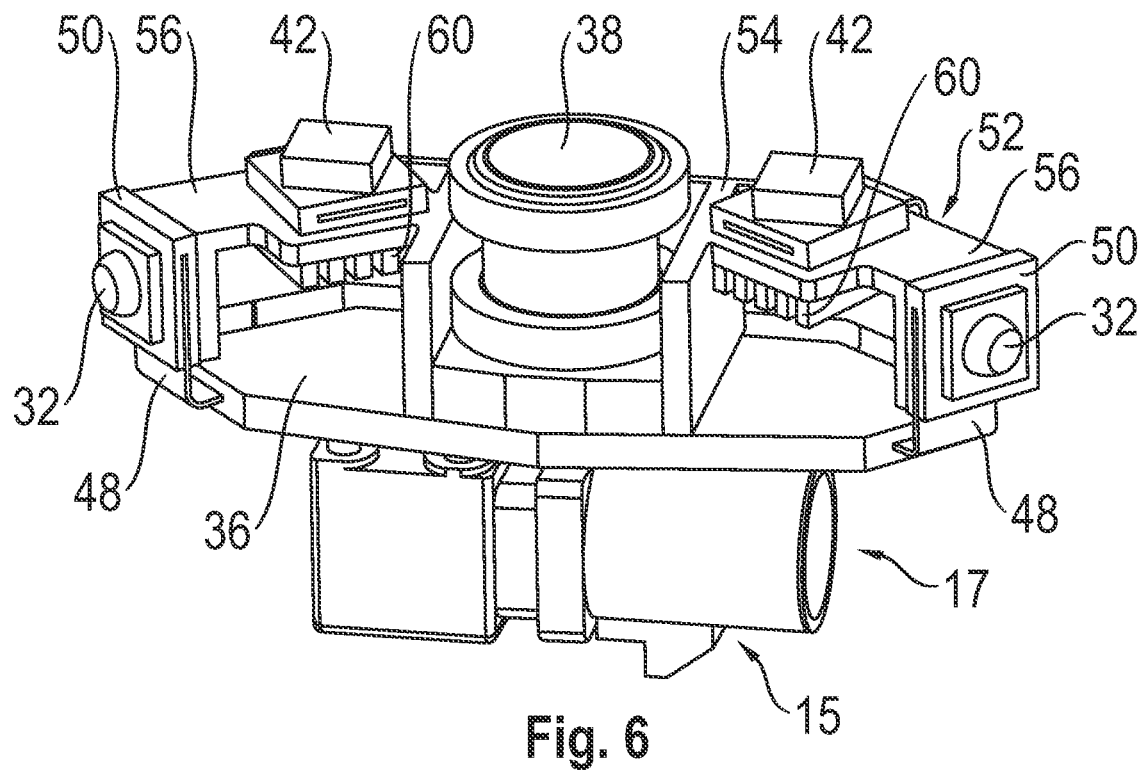
FIG. 6 is a first perspective view of internal components of the camera assembly of FIG. 1.
Figure 7:
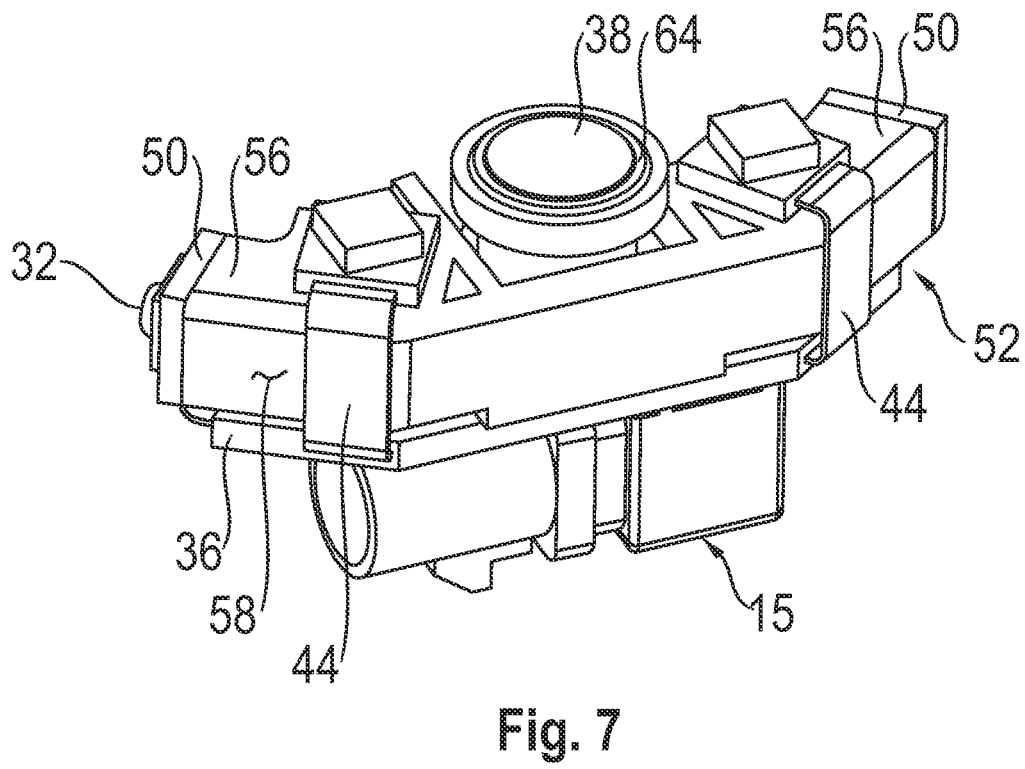
FIG. 7 is a second perspective view of the internal components of FIG. 6.
Figure 8:
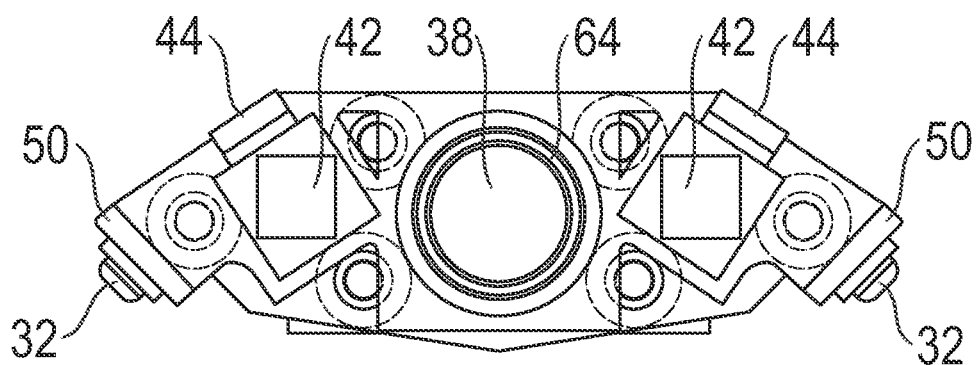
FIG. 8 is a top plan view of the cameral assemblies of FIGS. 1 and 3.
Figure 9:
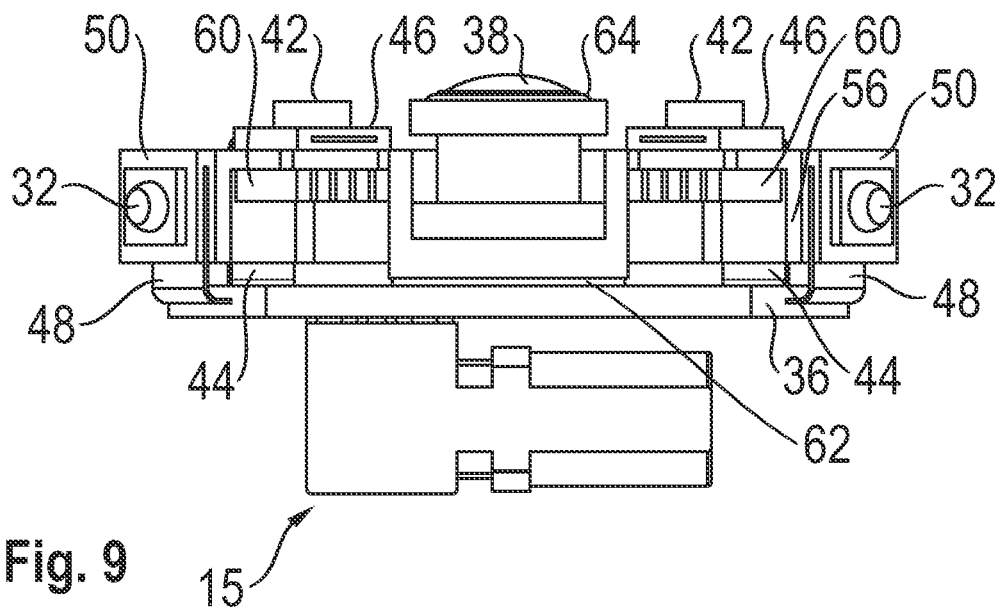
FIG. 9 is an elevational view of the internal components of the camera assembly of FIG. 1.
Figure 11:
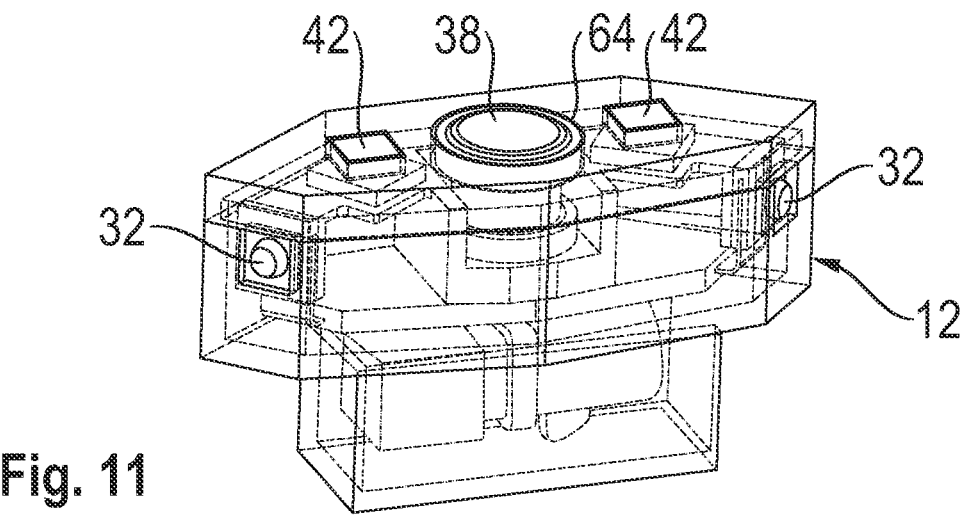
FIG. 11 is a side elevational view of the camera assembly of FIG. 1, illustrating the arrangement of the internal components within a camera housing.
Figure 12:
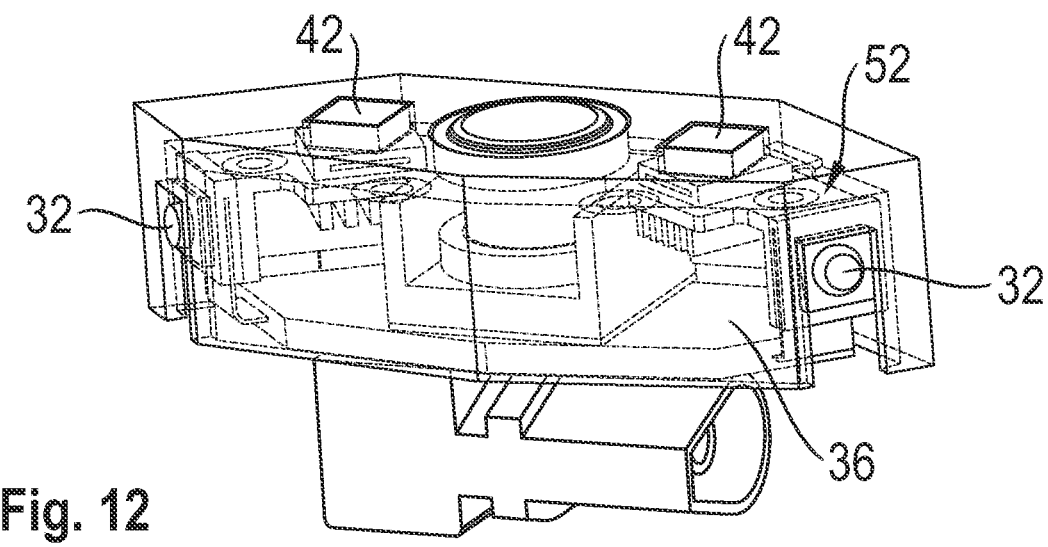
FIG. 12 is a side elevation view of the camera assembly of FIG. 3, illustrating the arrangement of the internal components within a camera housing.
Figure 13:
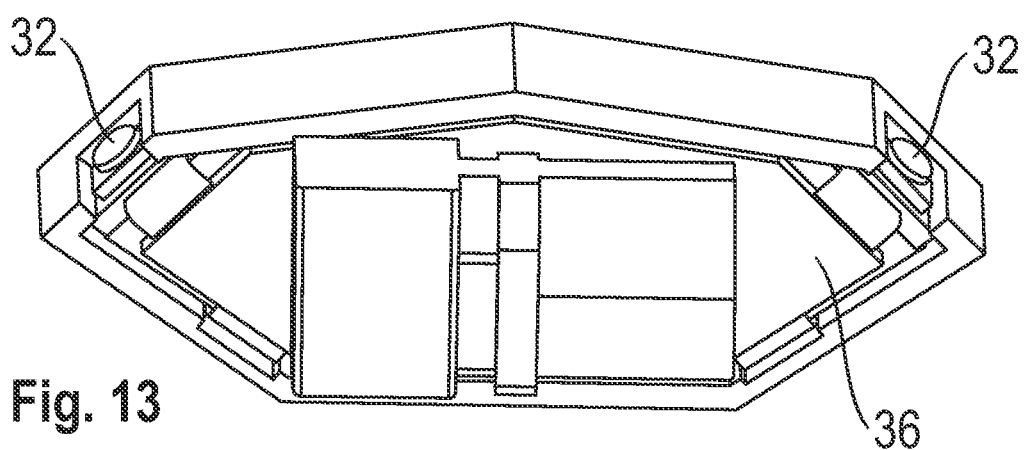
FIG. 13 is bottom view of the camera assembly of FIG. 1.

Referring to FIGS. 6-12, the camera assemblies 10 and 100 further include a lens mount 52. As best seen in FIG. 6, in one exemplary arrangement, the lens mount 52 includes a central mount section 54 and side mount arms 56. Side mount arms 56 extend laterally away from the central mount section 54. In one exemplary arrangement, the lens mount 52 is constructed of aluminum, although the disclosure is not limited to such an arrangement. The satellite PCBs 50 are positioned on side mount arms 56, with the illuminators 42 positioned on the satellite PCBs 50. The interface 44 extends across a peripheral surface 58 of the lens mount 52, as best seen in FIG. 7.

Because the illuminators 42 drive additional requirements for power dissipation in the camera assembly 10, 100, the lens mount 52 further includes an integrated heat sink 60. By integrating the heat sink 60 into the lens mount 52, the size and complexity of the camera assembly 10, 100 is significantly reduced over prior art systems. This arrangement is especially advantageous for automotive applications where interior cabin space is a premium when packaging remote camera assemblies.

During assembly, the lens 38 is attached to the central mount section 54 of the lens mount 52 and is aligned and secured with the PCB 36 using a securing element 62. In one exemplary arrangement, as shown best in FIG. 9, the securing element 62 is adhesive. Alternatively, in one exemplary configuration, the lens 38 may be integral with the lens mount 52 to provide a unitary structure. Once the lens 38 is aligned within the lens mount 52, the illuminators 42 are connected to the PCB 36 by the interface 44. More specifically, the interfaces 44 are positioned on the peripheral surface 58. In one exemplary arrangement, the illuminators 42 are attached to the lens mount 52 (via the satellite PCBs 50), and more specifically to the side mount arms 56, by a thermally conductive adhesive (not shown) being applied to a surface of the satellite PCBs 50.

In one exemplary arrangement, a compliant gasket 64 is positioned around the lens 38. The gasket 64 is configured to prevent the lens 38 from receiving stray light from the illuminators 42 that are positioned on either side of the lens 38. More specifically, the gasket prevents the lens 38 from receiving off axis light reflected or refracted by cover glass of the lens 38 from the illuminators 42. The gasket 64 may be held in position by either an adhesive interface to the housing 12, or a frictional engagement with an inner periphery of the lens opening 16 in the forward face 20 of the housing 12.

The gasket 64 contacts a cover glass that forms part of the lens 38. The cover glass is transparent in the near IR spectrum and mostly transparent (i.e., 80% transmission) in the visible spectrum. In one exemplary arrangement (not shown), the cover glass may further include a design feature that prevent total internal refraction from illuminators 42. Examples of such design features include walls or detents.

Once the lens 38 and the illuminators 42 are positioned with respect to the lens mount 52, and the lens mount 52 is secured to the printed circuit board 36, the housing 12 is secured over the internal components of the camera assemblies 10, 100. The illumination openings 18a, 18b assist in holding the illuminators 42 in place.

Figure 10A:
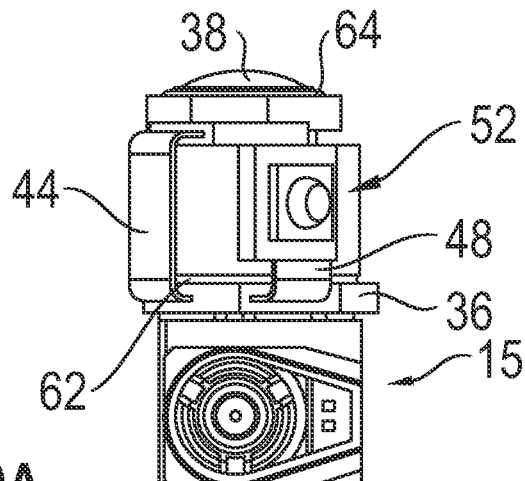
FIG. 10A is a first side elevational view of the internal components of the camera assembly of FIG. 1.
Figure 10B:
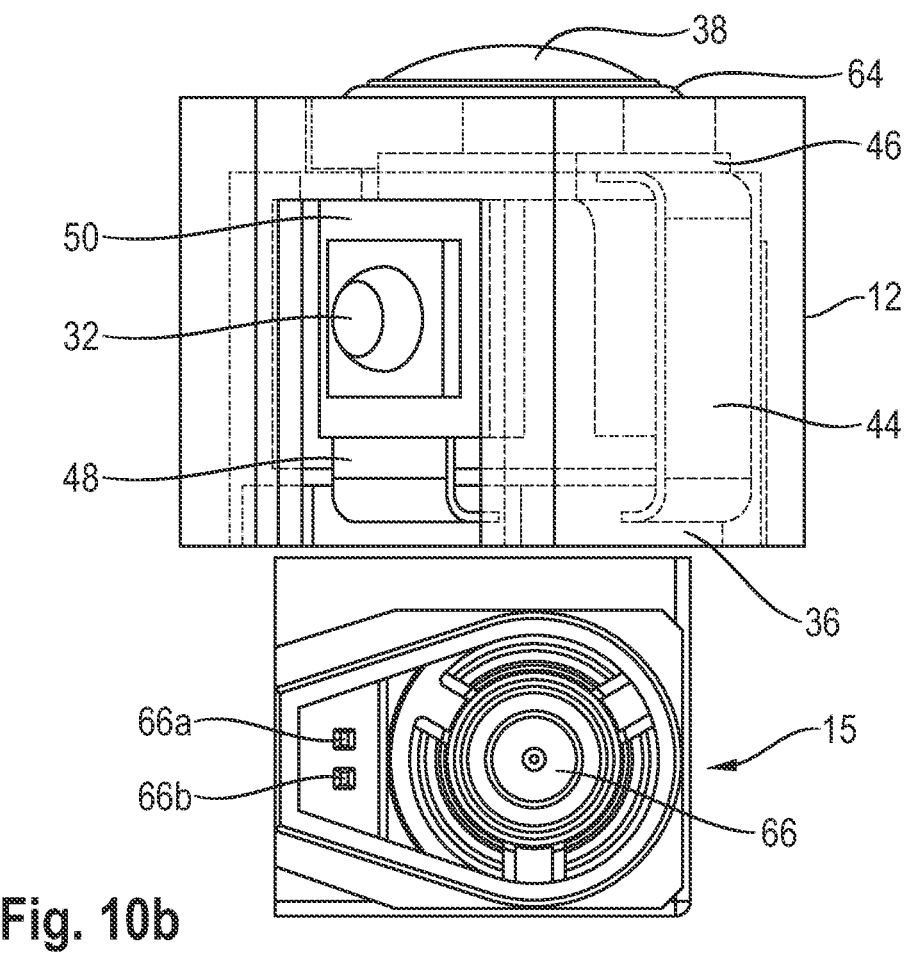
FIG. 10B is a second side elevational view of the camera assembly of FIG. 1.
Figure 14:
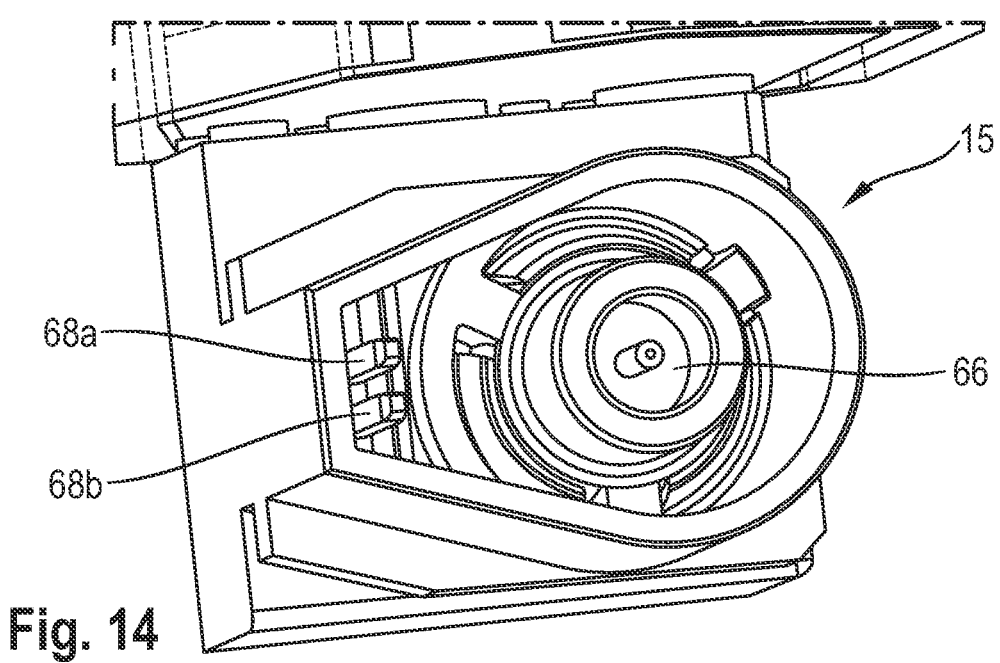
FIG. 14 is an enlarged perspective view of an operative end of the connector of FIG. 10B.

Referring to FIGS. 10B and 14, additional details of the connectors 15, 15' may be seen. More specifically, the connectors 15, 15' may include an arrangement for a coaxial connection 66, as well as two separate pins 68a, 68b for powering the illuminator circuit of the PCB 36, satellite PCBs 46, as well as the image sensor. In one exemplary arrangement, the illuminator circuit is placed on a separate connection from the image sensor to reduce noise on an image data line.

It will be appreciated that the camera assemblies and methods described herein have broad applications. The foregoing embodiments were chosen and described in order to illustrate principles of the methods and apparatuses as well as some practical applications. The preceding description enables others skilled in the art to utilize methods and apparatuses in various embodiments and with various modifications as are suited to the particular use contemplated. In accordance with the provisions of the patent statutes, the principles and modes of operation of this disclosure have been explained and illustrated in exemplary embodiments.

It is intended that the scope of the present methods and assemblies be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. It is intended that the following claims define the scope of the invention and that the method and apparatus within the scope of these claims and their equivalents be covered thereby. In sum, it should be understood that the invention is capable of modification and variation and is limited only by the following claims.

What is claimed:

1. A camera assembly for an interior of an automobile, comprising:
   a lens;
   an image sensor;
   a printed circuit board;
   a pair of illuminators; and
   a lens mount having a central mount section defined by wall sections extending from the printed circuit board and side mount arms that extend outwardly from the central mount section;
   wherein the lens, image sensor and the pair of illuminators are operatively connected to the printed circuit board; and
   wherein the lens mounted includes a pair of heat sinks disposed on the side mount arms, the heat sinks configured to dissipate heat from the pair of illuminators.

2. The camera assembly of claim 1, wherein the central mount section includes wall members extending transversely from a peripheral surface of the lens mount, and wherein the lens is disposed with in the central mount section.

3. The camera assembly of claim 2, wherein each illuminator of the pair of illuminators are positioned on respective side mount arms of the lens mount on either side of the lens mount, wherein each illuminator of the pair of illuminators is positioned adjacent the heat sink.

4. The camera assembly of claim 1, further comprising satellite printed circuit boards, wherein the satellite printed are laterally spaced from the printed circuit board, and wherein the satellite printed circuit boards are operatively connected to the printed circuit board by an interface.

5. The camera assembly of claim 4, wherein the interface is rigid.

6. The camera assembly of claim 1, further comprising at least one alert indicator that is operatively connected to the printed circuit board.

7. The camera assembly of claim 6, further comprising a second interface extending from the printed circuit board and operatively connected to a satellite printed circuit board, wherein the alert indicator is oriented perpendicular to the printed circuit board.

8. The camera assembly of claim 6, wherein the alert indicators include illuminators that emits light that is in the visible spectrum.

9. The camera assembly of claim 1, further comprising a gasket disposed around the lens, wherein the gasket prevents the lens from receiving off-axis light reflected or refracted by a cover glass of the lens from the at least one illuminator.

10. The camera assembly of claim 1, wherein the at least one illuminator emits light that is in in the near infrared spectrum.

11. The camera assembly of claim 1, further comprising a connector that is connected to the printed circuit board of the camera assembly, wherein the connector facilitates power to the camera assembly.

12. The camera assembly of claim 11, wherein the connector includes a receptacle for a coaxial connection to a controller, and wherein the connector includes two separate pins for powering an illuminator circuit and the image sensor of the printed circuit board so as to provide a separate connection between the illuminator circuit and the image sensor to reduce noise on an image data line.

13. The camera assembly of claim 1, wherein the lens and lens mount are integrated into a unitary structure.

14. A camera assembly for an interior of an automobile, comprising:
   a housing portion;
   at least one lens;
   an image sensor;
   a printed circuit board;
   pair of illuminators;
   a lens mount having a central mount section defined by wall sections extending from the printed circuit board and side mount arms that extend outwardly from the central mount section; and
   a connector that that is connected to the printed circuit board to facilitate power to the camera assembly;
   wherein the lens, image sensor and illuminators are operatively connected to the printed circuit board; and
   wherein the lens is disposed in the central mount section, the lens mount includes a pair of heat sinks disposed on the side mount arms, wherein each of the pair of illuminators is mounted to the side mount arms adjacent the heat sinks so as to dissipate heat from the illuminators during operation of the camera assembly.

15. The camera assembly of claim 14, further comprising a pair of satellite printed circuit boards to which the illuminators are operatively connected, wherein the satellite printed are laterally spaced from the printed circuit board, and wherein the satellite printed circuit boards are operatively connected to the printed circuit board by an interface.

16. The camera assembly of claim 14, further comprising a pair of alert indicators operatively connected to the printed circuit board by second interfaces, wherein the alert indicator is oriented perpendicular to the printed circuit board.

17. The camera assembly of claim 14, wherein the housing portion defines a front face and a peripheral surface, wherein the front face includes a lens opening and a pair of illuminator openings, wherein a portion of the lens protrudes from the lens opening and wherein each of the illuminators are disposed within the illuminator openings.

18. The camera assembly of claim 17, further comprising a pair of alert indicators operatively connected to the printed circuit board, wherein the peripheral surface of housing portion includes alert indicator openings formed therein, wherein the alert indicators are oriented perpendicular to the printed circuit board and disposed within the alert indicator openings.

19. The camera assembly of claim 17, further comprising a gasket disposed around the lens and contacting a cover glass that forms part of the lens, wherein the gasket prevents the lens from receiving off axis light reflected or refracted by the cover glass from the pair of illuminators.

20. The camera assembly of claim 19, wherein the gasket is held in positioned by an interface with housing.

21. A camera assembly for an interior of an automobile, comprising:
   a lens;
   an image sensor;
   a printed circuit board;
   at least one satellite printed circuit board, wherein the satellite printed circuit board is laterally spaced from the printed circuit board, and wherein the satellite printed circuit board is operatively connected to the printed circuit board by an interface;
   at least one illuminators; and
   a lens mount;
   wherein the lens, image sensor and at least one illuminator are operatively connected to the printed circuit board; and
   wherein the lens mount includes at least one integrated heat sink configured to dissipate heat from the at least one illuminators.

* * * * *